United States Patent [19]

Asada et al.

[11] Patent Number: 5,129,287
[45] Date of Patent: Jul. 14, 1992

[54] SHIFT CONTROL SYSTEM AND METHOD FOR AUTOMATIC TRANSMISSION

[75] Inventors: Toshiyuki Asada, Susono; Hideo Tomomatsu; Yasuo Hojo, both of Nagoya, all of Japan

[73] Assignee: Toyota Jidosha Kabushiki Kaisha, Toyota, Japan

[21] Appl. No.: 631,409

[22] Filed: Dec. 21, 1990

[30] Foreign Application Priority Data

Dec. 26, 1989 [JP] Japan .................. 1-337316

[51] Int. Cl.$^5$ .............................. B60K 41/06
[52] U.S. Cl. ......................... 74/866; 475/278
[58] Field of Search .............. 74/866; 475/277, 278, 475/285

[56] References Cited

U.S. PATENT DOCUMENTS

| | | | |
|---|---|---|---|
| 2,825,245 | 3/1958 | Hobbs | 475/278 |
| 3,043,163 | 7/1962 | Hobbs | 475/277 X |
| 3,115,793 | 12/1963 | Hobbs | 475/277 |
| 3,596,537 | 8/1971 | Koivunen | 192/85 AA X |
| 3,848,518 | 11/1974 | Martin | 192/85 AA X |
| 3,964,584 | 6/1976 | Bucksch | 192/87.11 |
| 4,225,026 | 9/1980 | Yamamori et al. | 192/85 AA |
| 4,233,861 | 11/1980 | Gaus et al. | |
| 4,395,925 | 8/1983 | Gaus | 475/284 X |
| 4,450,944 | 5/1984 | Fujioka | 192/85 AA X |
| 4,635,508 | 1/1987 | Tatsumi | 74/866 |
| 4,660,439 | 4/1987 | Hiraiwa | |
| 4,843,551 | 6/1989 | Milunas | 74/866 X |
| 4,846,021 | 7/1989 | Hamano et al. | 74/866 |

FOREIGN PATENT DOCUMENTS

| | | | |
|---|---|---|---|
| 3331937 | 3/1985 | Fed. Rep. of Germany | 74/866 |
| 57-173646 | 10/1982 | Japan | 74/866 |
| 2108219 | 5/1983 | United Kingdom | 192/85 AA |

Primary Examiner—Richard Lorence
Assistant Examiner—Benjamin Levi
Attorney, Agent, or Firm—Oblon, Spivak, McClelland, Maier & Neustadt

[57] ABSTRACT

A shift control system for use in an automatic transmission which comprises: a plurality of frictional engagement components; and a gear train adapted to set a plurality of speed stages having different gear ratios in accordance with the combination for engagement/release of the frictional engagement components and enabled to select a combination for engaging and releasing any of the frictional engagement components as that for engagement/release of the frictional engagement components for setting any of the speed stages. The shift control system comprises: a detector for detecting the engagement failure of the frictional engagement components; an engagement/release pattern selector for selecting a combination for releasing any one of the frictional engagement components as the combinations for engagement/release of the frictional engagement components for setting any one of the speed stages, if the engagement failure of any one of the frictional engagement components is detected; and an output device for outputting an instruction signal for setting the selected combination for engagement/release of the frictional engagement components.

12 Claims, 4 Drawing Sheets

SHIFT CONTROL SYSTEM AND METHOD FOR AUTOMATIC TRANSMISSION

BACKGROUND OF THE INVENTION

The present invention relates to an automatic transmission for use with vehicles and, more particularly, to a vehicular automatic transmission for setting a desired speed stage by engaging/releasing a plurality of frictional engagement means such as clutches in accordance with a plurality of kinds of combination patterns for engagement/release of the frictional engagement means.

A vehicular automatic transmission generally uses a plurality of planetary gear sets, each of which is composed of rotary components such as a sun gear, a ring gear and a carrier. The automatic transmission is constructed by connecting predetermined ones of the rotary components, by connecting any of the rotary components selectively to an input shaft through clutch means, by fixing another rotary component selectively by brake means, and by connecting an output shaft to still another rotary component. In the automatic transmission thus constructed, the number of speed stages to be set, the gear ratios at the individual speed stages, and the rotational speed, loads or torques of the rotary components are varied in dependence upon the number of the planetary gear sets used, the manner how to connect the individual rotary components, and the number of and the manner how to dispose frictional engagement means such as the clutch means or the brake means, so that a remarkable variety of automatic transmissions can be constructed. All the structures could not be put into practical use, although they could be made in principle. It is not easy in the least to create a structure which can sufficiently meet the practical requirements such as feasible production, small size and low weight, ample shift controllability and excellent durability. For example, even an automatic transmission using three planetary gear sets to set forward five and reverse one speed stages might have an excessively large gear ratio for the reverse stage in dependence upon the manners how to arrange the frictional engagement means such as the clutches and how to adopt the gear ratio (i.e., the ratio of tooth numbers of the sun gears and the ring gears). For this automatic transmission, it would be necessary to increase the capacities of the frictional engagement means, thus raising a problem that the durabilities of the frictional engagement means and the bearings might be deteriorated. In order to solve this problem, as disclosed in Japanese Patent Laid-Open No. 60-57036, there is proposed an automatic transmission which is constructed to have a reverse gear ratio approximate to that for the forward 1st speed.

The structure of the automatic transmission according to this proposal will be briefly described in the following. This automatic transmission is composed mainly of three single pinion type planetary gear sets and is constructed by connecting the sun gear of the first planetary gear set and the sun gear of the second planetary gear set always or selectively, by connecting the sun gear of the first planetary gear set and the carrier of the second planetary gear set, if necessary, through a clutch, by connecting the ring gear of the second planetary gear set and the ring gear of the third planetary gear set, by connecting the carrier of the first planetary gear set with those ring gears, and by connecting the carrier of the second planetary gear set and the sun gear of the third planetary gear set through a clutch. The input shaft is connected through a clutch to the sun gears of the first and second planetary gear sets, which are connected to each other, and further to the ring gear of the first planetary gear set through another clutch. On the other hand, the output shaft is connected to the carrier of the third planetary gear set. As the brake means for stopping the revolutions, moreover, there are provided a brake for fixing the sun gear of the first planetary gear set and the sun gear of the second planetary gear set and a brake for fixing the sun gear of the third planetary gear set.

On the other hand, the structure, in which a one-way clutch is interposed between the carrier of the second planetary gear set and the casing, is shown in skeleton diagram in the aforementioned Japanese Patent Laid-Open No. 60-57036. However, this Laid-Open has failed to disclose the corresponding clutch and brake application chart and describe the speed stages to be set. Therefore, it is conceivable that the structure arranged with the additional one-way clutch sets the individual speed stages like other embodiments disclosed.

The automatic transmission thus disclosed in the prior art is enabled to set forward seven speeds and reverse one speed as a whole by adding 2.5th and 3.5th speeds to the main speed stages of forward five and reverse one speeds. However, the combination for engagement/release of the clutches and the brakes for setting each of the speed stages is only one. In case, therefore, a shift valve for actuating any clutch or brake is troubled, if the oil passage leading to the shift valve is clogged or if a solenoid valve for operating the shift valve is troubled, that clutch or brake turns inactive so that the speed stage to be effective thereby cannot be set. In case such failure occurs, what can be done by the automatic transmission of the prior art thus far described is to set another in place of the speed stage which cannot be set. In this case, the automatic transmission may have its running performance deteriorated due to shortage of the drive force or reduction of the vehicle speed even with a sufficient drive force being obtained.

SUMMARY OF THE INVENTION

An object of the present invention is to prevent the running performance from being deteriorated even if frictional engagement means such as a clutch or brake has its engagement troubled.

Another object of the present invention is to prevent any of speed stages from being disabled to set even with the engagement failure of the frictional engagement means.

Still another object of the present invention is to make effective use of a plurality of combinations for engagement/release of the frictional engagement means for setting any of the speed stages.

According to the present invention, there is provided, in an automatic transmission comprising: a plurality of frictional engagement means; and a gear train adapted to set a plurality of speed stages each having different gear ratios in accordance with a selected combination for engagement/release of said frictional engagement means and enabled to select a combination for engaging and releasing any of said frictional engagement means as that for engagement/release of said frictional engagement means for setting any of said speed stages, a shift control system comprising: detection means for detecting the engagement failure of said frictional engagement means; engagement/release pattern selecting means for selecting a combination for releasing any one of said frictional engagement means based on vehicle conditions and for selecting another of the combinations for engagement/release of said frictional engagement means for setting any one of said speed stages when the engagement failure of any one of said frictional engagement means is detected; and output means for outputting an instruction signal for setting the selected combination for engagement/release of said frictional engagement means.

According to the present invention, there is also provided, in an automatic transmission comprising: a plurality of frictional engagement means; and a gear train adapted to set a plurality of speed stages each having different gear ratios in accordance with a selected combination for engagement/release of said frictional engagement means and enabled to select a combination for engaging and releasing any of said frictional engagement means as that for engagement/release of said frictional engagement means for setting any of said speed stages, a shift control method comprising the steps of: detecting the engagement failure of said frictional engagement means; selecting a combination for releasing any one of said frictional engagement means based on vehicle conditions and selecting another of the combinations for engagement/release of said frictional engagement means for setting any one of said speed stages when the engagement failure of any one of said frictional engagement means is detected; and outputting an instruction signal for setting the selected combination for engagement/release of said frictional engagement means.

The above and further objects and novel features of the present invention will more fully appear from the following detailed description when the same is read in connection with the accompanying drawings. It is to be expressly understood, however, that the drawings are for the purpose of illustrations and are not intended as a definition of the limits of the invention.

BRIEF DESCRIPTION OF THE DRAWINGS

A more complete appreciation of the present invention and many of the attendant advantages thereof with be readily obtained as the same becomes better understood by reference to the following detailed description when considered in connection with the accompanying drawings, wherein.

DETAILED DESCRIPTION OF THE PREFERRED EMBODIMENTS

Figure 1:
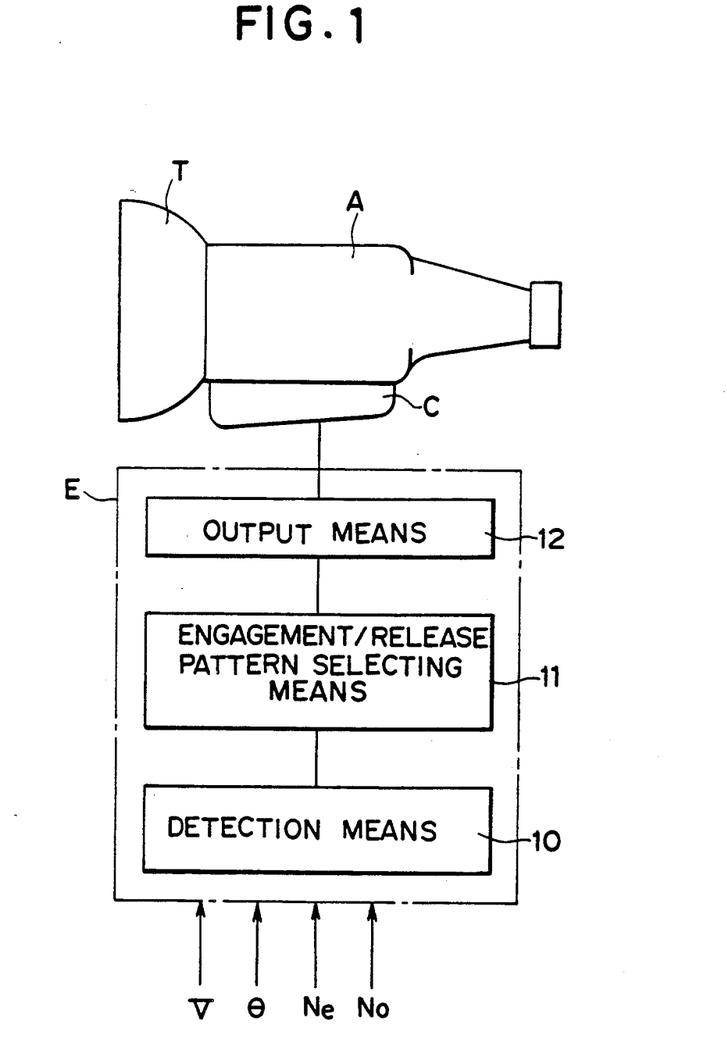
FIG. 1 is a block diagram showing the gist of the present invention.

As shown in FIG. 1, an automatic transmission A is connected through a torque converter T to the engine (although not shown) and is equipped with a gear train and frictional engagement means, as will be described hereinafter. Moreover, this automatic transmission A is set to a plurality of speed stages by engaging or releasing the frictional engagement means with an oil pressure fed from a hydraulic control circuit C.

This hydraulic control circuit C has a plurality of solenoid valves (although not shown), which are to be turned on or off in response to signals outputted from an electronic control unit E. This control unit E is constructed mainly of a microcomputer, which is made receptive of control data including a vehicle speed V, a throttle opening $\theta$, the engine rotational speed Ne of the engine, and the rotational speed No of the output shaft, and is equipped with detection means 10, engagement/release pattern selecting means 11 and output means 12.

The detection means 10 is provided for detecting a failure in the engagement of the frictional engagement means. Specifically, the detection means 10 detects the engagement failure if the difference between the engine rotational speed Ne and the product of the output shaft rotational speed No and a gear ratio $\gamma$ exceeds a predetermined limit. On the other hand, the engagement/release pattern selecting means 11 selects a combination (as will be referred to as the "engagement/release pattern") for engagement/release of the frictional engagement means for setting a speed stage on the basis of the running state. For a speed stage in which a plurality of kinds of engagement/release patterns can be selected, the engagement/release pattern selecting means 11 selects the engagement/release pattern for releasing the frictional engagement means based on vehicle conditions such as shift controllability and durability. It selects another combination when an engagement failure is detected. On the other hand, the output means 12 outputs an instruction signal for setting a selected one of the engagement/release patterns to the hydraulic control circuit C.

A more specific example of the present invention will be described in the following.

In the example shown in FIG. 2, the gear train is composed mainly of three single-pinion type planetary gear sets 1, 2 and 3, the individual components of which are connected, as follows. The carrier 1C of the first planetary gear set 1 and the ring gear 3R of the third planetary gear set 3 are so connected to each other that they can rotate together, and the ring gear 2R of the second planetary gear set 2 and the carrier 3C of the third planetary gear set 3 are so connected to each other that they can rotate together. Moreover, the sun gear 1S of the first planetary gear set 1 is connected to the carrier 2C of the second planetary gear set 2 through second clutch means K2 and further to the sun gear 2S of the second planetary gear set 2 through fourth clutch means K4. The carrier 2C of the second planetary gear set 2 in turn is connected to the sun gear 3S of the third planetary gear set 3 through the fifth clutch means K5.

Incidentally, the individual components recited above can adopt such a connecting mechanism, e.g., a quill shaft, a solid shaft or a suitable connecting drum as is currently used in the existing automatic transmission.

An input shaft 4 is connected the (not-shown) engine through power transmission means such as a torque converter or a fluid coupling. Between this input shaft 4 and the ring gear 1R of the first planetary gear set 1, there is interposed first clutch means K1 for connecting the two selectively. Between the input shaft 4 and the sun gear 1S of the first planetary gear set 1, on the other hand, there is interposed third clutch means K3 for connecting the two selectively.

Of the aforementioned first to fifth clutch means K1 to K5, the fourth clutch means K4 is composed of a one-way clutch 20 and a multiple disc clutch 22 which are disposed in parallel with each other. The other clutch means are composed of multiple disc clutches. Since the individual components are restricted in their arrangements for practical purposes, it is quite natural that suitable intermediate members such as connecting drums could be interposed as the connecting members for the individual clutch means K1, K2, K3, K4 and K5.

As brake means for stopping the revolutions of the rotary components of the aforementioned planetary gear sets 1, 2 and 3, on the other hand, there are provided: first brake means B1 for stopping the revolutions of the sun gear 3S of the third planetary gear set 3 selectively; second brake means B2 for stopping the revolutions of the carrier 2C of the second planetary gear set 2 selectively; third brake means B3 for stopping the revolutions of the sun gear 2S of the second planetary gear set 2 selectively; and fourth brake means B4 for stopping the revolutions of the sun gear 1S of the first planetary gear set 1 selectively. Of these brake means, the first brake means B1 is composed of: a one-way clutch 40 which is interposed between the sun gear 3S of the third planetary gear set 3 and a transmission casing (as will be shortly referred to as the "casing") 6; and a band brake 42 disposed in parallel with the one-way clutch 40. On the other hand, the second brake means B2 is composed of a multiple disc brake whereas the third brake means B3 and the fourth brake means B4 are individually composed of band brakes. For practical purposes, it is quite natural that suitable connecting members could be interposed between those brake means B1, B2, B3 and B4 and either the individual components to be stopped by the brake means B1 to B4 or the casing 6.

Moreover, an output shaft 5 for transmitting the revolutions to the propeller shaft or the counter gear (although neither of them are shown) is connected to the ring gear 2R of the second planetary gear set 2 and the carrier 3C of the third planetary gear set 3, which in turn are connected to each other.

Figure 2:
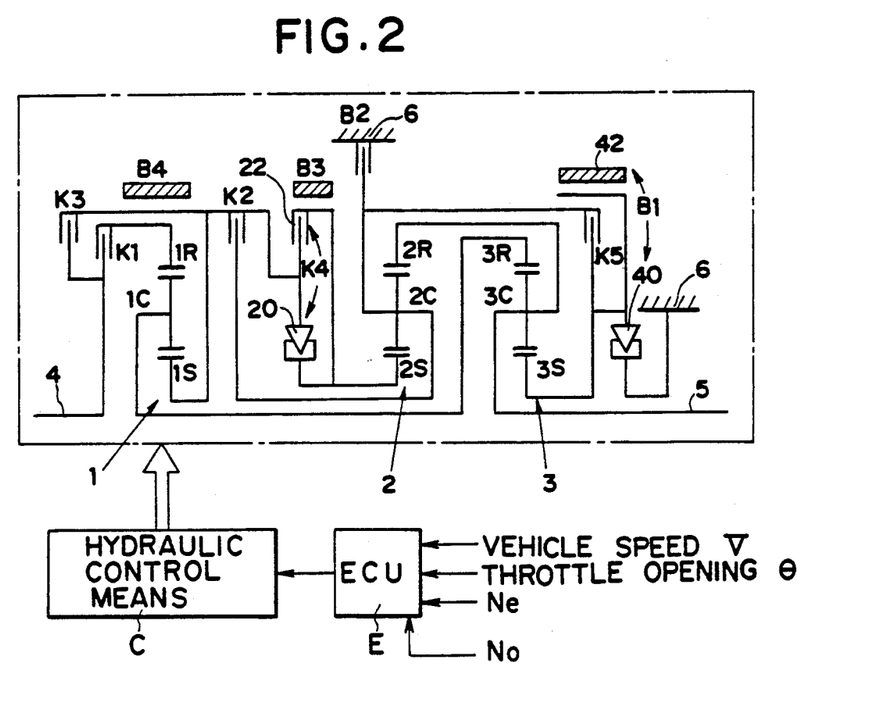
FIG. 2 is a skeleton diagram showing an automatic transmission according to an embodiment of the present invention.

Thus, the automatic transmission having the structure shown in FIG. 2 is enabled in principle to set forward ten and reverse one speed stages, which are composed of main forward five and reverse one speed stages by adding the so-called "2.2th, 2.5th and 2.7th speeds" between the forward 2nd and 3rd speeds and the so-called "3.2th and 3.5th speeds" between the forward 3rd and 4th speeds. Moreover, the speed stages other than the 2.2th, 2.7th, 3.2th and 3.5th speeds are set by a plurality of combinations (i.e., the so-called "engagement/release patterns") for engagement/release of the clutch means and the brake means for setting those speed stages are enumerated in the form of clutch and brake application chart in Table 1. Moreover, the load torques of the frictional engagement means in the individual engagement/release patterns are enumerated in Table 2 at ratios corresponding to the case in which the input torque is assumed to take a value of "1". In Table 1: symbols ○ indicate that the components are to be engaged; blanks indicate that the components are to be released; and symbols * indicate that the components may be engaged. Moreover, these symbols * indicate: such fifth clutch means K5 or first brake means B1 at the 1st speed that neither the gear ratio nor the revolving state is unchanged even if released; such first brake means B1 in the pattern of the column b at the 4th speed that not the gear ratio but the revolving state is changed if released; and such fourth clutch means K4 or third brake means B3 in the pattern of the column b of the 2nd speed that neither the gear ratio nor the revolving state is unchanged even if released if other means indicated at the symbols * are engaged. Still moreover, the columns indicated at a, b, c, ———, and so on at the 2nd, 3rd, 4th and 5th speeds and the reverse stage and appearing in Tables 1 and 2 indicate such ones of the engagement/release patterns for setting the speed stages under consideration that the rotational speeds of the rotary components of the planetary gear sets are different. Furthermore, symbols ①, ②, ③, ———, and so on indicate the kinds of the engagement/release patterns in which the rotary components of the planetary gear sets do not have different rotational speeds.

TABLE 2

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |  | ① | 1.00 |  |  | 0.45 | 1.56 | 2.15 | * |  |  |
|  |  | ② | 1.00 |  |  | 0.45 | 0.59 | * | 2.15 |  |  |
|  |  | ③ | 1.00 |  |  | 0.45 | * | 0.59 | 1.56 |  |  |
| 2nd | a | ① | 1.00 | 0.45 |  |  | 0.45 | 1.04 | * |  | * |
|  |  | ② | 1.00 | 0.45 |  |  | 0.59 | * | 1.04 |  | * |

TABLE 2-continued

|  |  |  | Clutch Means | | | | | Brake Means | | | |
| --- | --- | --- | --- | --- | --- | --- | --- | --- | --- | --- | --- |
|  |  |  | K1 | K2 | K3 | K4 | K5 | B1 | B2 | B3 | B4 |
|  |  | ③ | 1.00 | 0.59 |  |  | 0.59 | * | * |  | 1.04 |
|  |  | ④ | 1.00 | 0.45 |  |  | * | 0.59 | 0.45 |  | * |
|  |  | ⑤ | 1.00 | * |  |  | * | 0.59 | * |  | 0.45 |
|  |  | ⑥ | 1.00 | * |  |  | 0.59 | * | 0.59 |  | 0.45 |
|  | b | ① | 1.00 |  |  | 0.45 |  | 0.59 |  | 0.45 | * |
|  |  | ② | 1.00 |  |  | * |  | 0.59 |  | * | 0.45 |
| 2. 2th |  |  | 1.00 | 0.45 |  |  |  | 0.59 |  | 0.13 |  |
| 2. 5th |  | ① | 1.00 |  |  | 0.45 | 0.59 |  |  | 0.62 | * |
|  |  | ② | 1.00 |  |  | 0.17 | 0.59 |  |  | * | 0.62 |
|  |  | ③ | 1.00 |  |  | * | 0.59 |  |  | 0.17 | 0.45 |
| 2. 7th |  |  | 1.00 | 0.63 | 0.18 |  |  | 0.59 | * |  |  |
| 3rd | a | ① | 0.69 |  | 0.31 |  | * | 0.41 | * |  |  |
|  |  | ② | 0.69 |  | 0.31 |  | 0.41 | * | 0.41 |  |  |
|  | b |  | 0.69 |  | 0.31 |  |  | 0.41 |  | * |  |
|  | c |  | 0.69 |  | 0.31 | * |  | 0.41 |  |  |  |
|  | d |  | 0.69 | * | 0.31 |  |  | 0.41 |  |  |  |
| 3. 2th |  |  | 1.00 | 0.45 |  |  | 0.59 |  |  | 0.30 |  |
| 3. 5th |  |  | 0.69 |  | 0.31 |  | 0.41 |  |  | 0.12 |  |
| 4th | a | ① | * | 1.41 | 1.00 | 0.41 | * |  |  |  |  |
|  |  | ② | 0.49 | 0.29 | 0.51 | * | 0.29 |  |  |  |  |
|  |  | ③ | 1.00 | 0.87 | * | 0.42 | 0.59 |  |  |  |  |
|  |  | ④ | 0.62 | * | 0.38 | 0.10 | 0.36 |  |  |  |  |
|  | b |  |  | 1.41 | 1.00 | 0.41 | * |  |  |  |  |
| 5th | a |  |  | 1.00 | 1.00 |  | * |  |  | 0.29 |  |
|  | b |  | * | 1.00 | 1.00 |  |  |  |  | 0.29 |  |
|  | c |  |  | 1.00 | 1.00 |  |  | * |  | 0.29 |  |
| Rev. | a | ① |  | 1.00 | 1.00 | * | * | 3.47 |  |  |  |
|  |  | ② |  | 1.00 | 1.00 | 3.47 | 3.47 | * |  |  |  |
|  | b |  | * |  | 1.00 | 1.00 |  |  | 3.47 |  |  |

Table 1 enumerates the shift stages which can be set in principle. For the practical purpose, a speed stage capable of establishing excellent power performance and accelerability is selected from those enumerated in Table 1. Specifically, the speed stages having the gear ratios in relations approximate to the geometric series are selected as the main ones, and the speed stages advantageous in the shift controllability and durability are selected from those of Table 1. In the example shown in FIG. 1, on the other hand, the fourth clutch means K4 and the first brake means B1 are individually equipped with the one-way clutches 20 and 40. As a result, the engagement of the fourth clutch means K4 is ordinarily maintained by the one-way clutch 20 to engage the multiple disc clutch 22 when the engine braking is necessary, if the relative revolutions of the sun gear 1S of the first planetary gear set 1 and the sun gear 2S of the second planetary gear set 2 are directed to engage the one-way clutch 20. If, on the contrary, the relative revolutions of the aforementioned two sun gears 1S and 2S are directed to release the one-way clutch 20, the multiple disc clutch 22 is engaged to bring the fourth clutch means K4 into the engaged state. These engagement relations are likewise applied to the first brake means B1. If the revolutions of the sun gear 3S of the third planetary gear set 3 are directed to engage the one-way clutch 40, this clutch 40 is engaged to bring the first brake means B1 into the engaged state so that the multiple disc brake 42 is engaged when the engine braking is required. If, on the contrary, the revolutions of the sun gear 3S of the third planetary gear set 3 are directed to release the one-way clutch 40, the multiple disc brake 42 is engaged to bring the first brake means B1 into the engaged state.

In the automatic transmission shown in FIG. 2, too, the setting of each of the speed stages is effected like the automatic transmission of the prior art in accordance with both the engine load represented by the throttle opening and the vehicle speed. The control means for this setting is exemplified by: the hydraulic control circuit C for supplying or relieving the oil pressures for engaging or releasing the aforementioned individual clutch means and brake means; and the electronic control unit (ECU) E for outputting electric instructions to the hydraulic control circuit C on the basis of its input data such as the engine rotational speed Ne, the output shaft rotational speed No, the vehicle speed V, the throttle opening $\theta$, the shift position, the running mode select signal or the oil temperature.

For the speed stage having plural kinds of engagement/release patterns, the control system constructed of those hydraulic control circuit C and the electronic control unit E selects an engagement/release pattern ordinarily in preference to vehicle conditions such as the shift controllability and the durability. In case, on the other hand, some frictional engagement means fails to engage or has its torque capacity reduced abnormally, the control means selects and outputs an engagement/release pattern disusing that frictional engagement means. These operations will be specifically described in the following.

As enumerated in Tables 1 and 2, there are three kinds of engagement/release patterns for setting the forward 1st speed. According to the pattern ① or ②, however, a torque as high as two times or more than the input torque is applied to the first brake means B1 or the second brake means B2, as can be seen from Table 2. Therefore, a control is made to set the 1st speed according to the pattern ③, in which the first and fourth clutch means K1 and K4 and the first and second brake means B1 and B2 are engaged. Another control for setting the 2nd speed is made according to the pattern ① of the column b, in which the first and fourth clutch means K1 and K4 and the first and third brake means B1 and B3 are engaged. This is because the shift between the 1st and 2nd speeds can be achieved by switching the states of engagement/release of the second brake means B2 and the third brake means B3 and because there is no frictional engagement means having a load torque exceeding "1". The third speed is controlled to be set according to the pattern of the column c, in which the first clutch means K1, the third clutch means K3 and the first brake means B1 are engaged. This is because the shift between the 2nd and 3rd speeds can be achieved by switching the engagement/release stages of the third clutch means K3 and the third brake means B3. The 4th speed is set according to the pattern ④ of the column a. After this, this pattern ④ is changed to the pattern ① prior to or simultaneously with the shift to the 5th speed. Specifically, since the pattern ④ of the column a is one for engaging the first and third to fifth clutch means K1, K3, K4 and K5, the shift from the 3rd speed can be achieved by switching the engagement/release states of the fifth clutch means K5 and the first brake means B1. Moreover, the change to the pattern ① will lead to neither the gear ratio nor any fluctuation of the rotational speeds of the rotary members. Moreover, the 5th speed is controlled to be set according to the pattern of the column a, i.e., the pattern in which the second and third clutch means K2 and K3 and the third brake means B3 are engaged. As a result, the shift between the 4th and 5th speeds can be achieved by switching the engagement/release patterns of the fourth clutch means K4 and the third brake means B3. Incidentally, the reverse speed is set according to the pattern ② of the column a.

Since the shifts are executed by selectively the aforementioned individual patterns, the number of the frictional engagement means to be switched for the shifts is reduced two or less so that the shift controls can be facilitated, and the load torques to be applied to the frictional engagement means are reduced to improve the durability. If any of the frictional engagement means or the mechanism for actuating the former is troubled during such shift controls, the aforementioned control system executes the following controls, as specified by the flow chart of FIG. 3.

Figure 3:
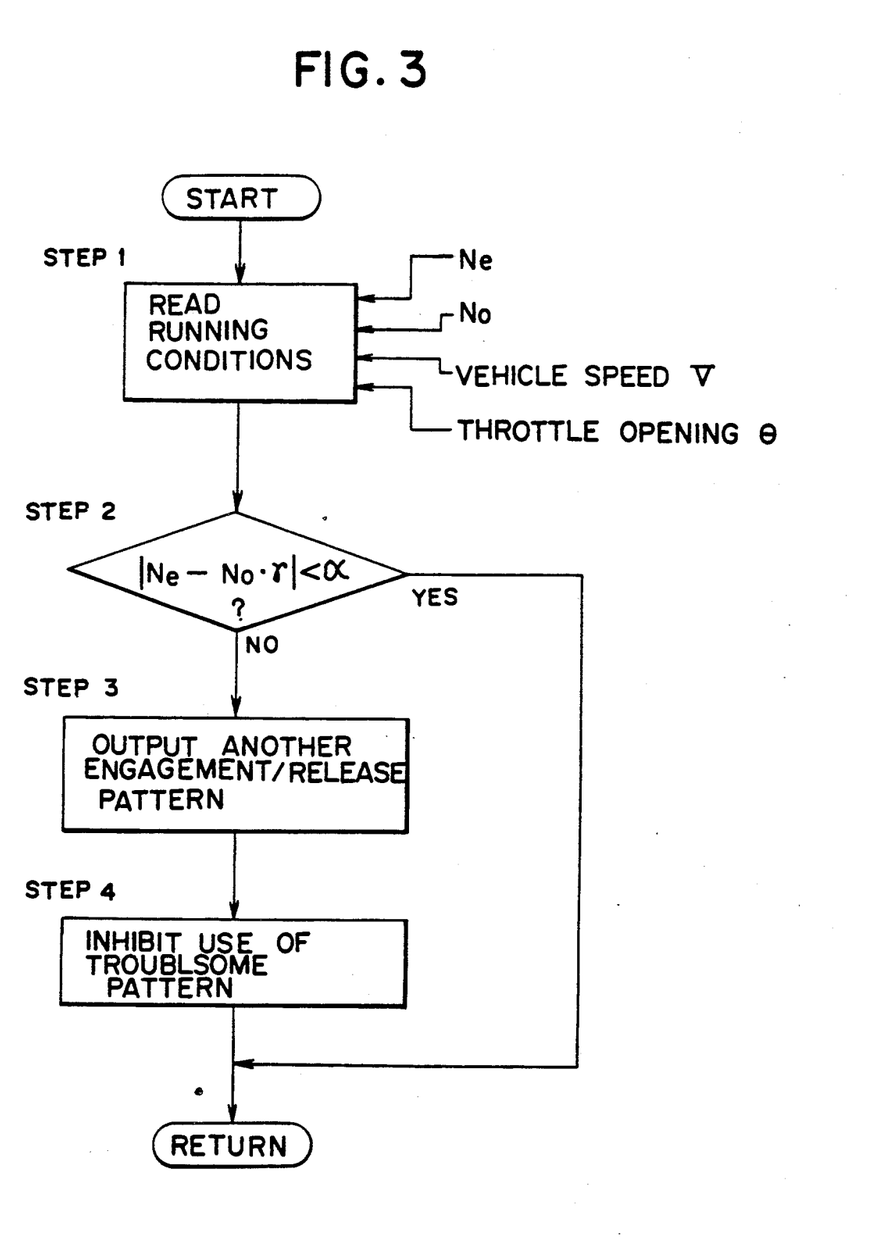
FIG. 3 is a flow chart showing an example of the control procedures in the automatic transmission shown in FIG. 2.

Specifically, FIG. 3 presents a flow chart for controlling the decision of occurrence of a failure and the change in the engagement/release pattern. First of all, the vehicular running conditions such as the engine rotational speed Ne, the output shaft rotational speed No, the vehicle speed V and the throttle opening $\theta$ are read at Step 1. At Step 2, whether or not the frictional engagement means are troubled is then decided from the engine rotational speed Ne and the output shaft rotational speed No. Specifically, the product of the output shaft rotational speed No and the gear ratio $\gamma$ is compared with the engine rotational speed Ne. More specifically, the absolute value $|Ne - No \cdot \gamma|$ of the difference of the two is determined to decide whether or not the value is smaller than a predetermined value $\alpha$. If no failure occurs, the above-specified difference is equal or approximate to zero so that the decision result of Step 2 is "YES". Otherwise, the rotational speed of the output shaft 5 is far larger or smaller than the value determined by the gear ratio, so that the decision result of Step 2 is "NO". Therefore, the routine is returned, if the decision result of Step 2 is "YES", but advance to Step 3, if "NO", so that another engagement/release pattern is outputted. For example, the forward 1st speed is ordinarily set according to the pattern ③ appearing in Tables 1 and 2, as has been described hereinbefore. In case, however, it is attained from the decision result of Step 2 that the second brake means B2, the (not shown) hydraulic servomechanism for operating the means B2 or the (not shown) solenoid valve disposed in the oil passage leading to the servomechanism is troubled so that the second brake means B2 fail to engage, the engagement/release pattern for setting the 1st speed is changed to the pattern ①, i.e., the pattern in which the second brake means B2 is not engaged. Incidentally, in case there are a plurality of kinds of other engagement/release patterns to be selected at the time of a change into the engagement/release pattern as a result of the failure, it is preferable to select a more advantageous pattern by considering the load torques to be applied to the frictional engagement means, the number of the frictional engagement means to be switched for the shift, or the fluctuating rotational speed of the rotary members at the time of the shift. If the troublesome frictional engagement means can be instantly shot, the engagement/release pattern to be changed can be instantly selected, as described above. Otherwise, the procedures are returned from Step 3 to Step 2 to decide again the existence of a failure. Thus, the engagement/release patterns may be selected by the method of trial and error.

In case, moreover, the engagement/release pattern, in which the troublesome frictional engagement means shall be engaged, is thus found out, it is inhibited at Step 4. From now on, the engagement/release pattern, in which said troublesome frictional engagement means is to be engaged, is not used.

In the automatic transmission of FIG. 2 equipped with the aforementioned control system, therefore, even if any of the frictional engagement means fails to engage or if the capacity of the torque to be transmitted is extraordinarily reduced, the speed stage, which is designed to use that frictional engagement means, is not instantly disabled to set but can be set in most cases according to another engagement/release pattern. This makes it possible to effectively prevent that reduction in the running performance, which might otherwise be caused due to the disappearance of an intermediate speed stage.

Figure 4:
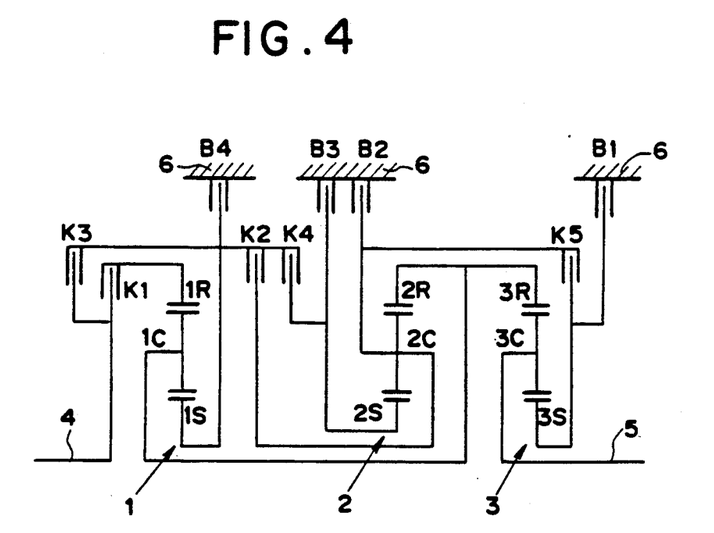
FIG. 4 is a skeleton diagram showing an example of the gear train.

The present invention should have its application not limited to the aforementioned structure shown in FIG. 2 but extended to an automatic transmission of another structure, as exemplified in FIG. 4. The structure, as shown in FIG. 4, is modified from that shown in FIG. 2 such that the connections of the rotary components of the gear train are partially changed. Specifically, the first to third planetary gear sets 1, 2 and 3 of single-pinion type are arrayed on a common axis between the input shaft 4 and the output shaft 5, which are arranged on the common axis. The ring gear 2R of the second planetary gear set 2 and the ring gear 3R of the third planetary gear set 3 are connected to each other and further to the carrier 1C of the first planetary gear set 1. Moreover, the clutch means are exemplified by: first clutch means K1 for connecting the input shaft 4 and the ring gear 1R of the first planetary gear set 1; second clutch means K2 for connecting the sun gear 1S of the first planetary gear set 1 and the carrier 2C of the second planetary gear set 2; third clutch means K3 for connecting the input shaft 4 and the sun gear 1S of the first planetary gear set 1; fourth clutch means K4 for connecting the sun gear 1S of the first planetary gear set 1 and the sun gear 2S of the second planetary gear set 2; and fifth clutch means K5 for connecting the carrier 2C of the second planetary gear set 2 and the sun gear 3S of the third planetary gear set 3. On the other hand, the brake means are exemplified by: first brake means B1 for stopping the sun gear 3S of the third planetary gear set 3; second brake means B2 for stopping the carrier 2C of the second planetary gear set 2; third brake means B3 for stopping the sun gear 2S of the second planetary gear set 2; and fourth brake means B4 for stopping the sun gear 1S of the first planetary gear set 1. Moreover, the output shaft 5 is connected to the carrier 3C of the third planetary gear set 3.

The automatic transmission, as shown in FIG. 4, can also establish a plurality of kinds of engagement/release patterns for a plurality of speed stages, as enumerated in Table 3:

TABLE 3

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | * | | |
| | | ② | ○ | | | ○ | ○ | * | ○ | | |
| | | ③ | ○ | | | ○ | * | ○ | ○ | | |
| 2nd | a | ① | ○ | ○ | | | ○ | ○ | * | | * |
| | | ② | ○ | ○ | | | ○ | * | ○ | | * |
| | | ③ | ○ | ○ | | | ○ | * | * | | ○ |
| | | ④ | ○ | ○ | | | * | ○ | ○ | | * |
| | | ⑤ | ○ | * | | | * | ○ | * | | ○ |
| | | ⑥ | ○ | * | | | ○ | * | ○ | | ○ |
| | b | ① | ○ | ○ | | ○ | | ○ | * | ○ | * |
| | | ② | ○ | ○ | | * | | ○ | * | * | ○ |
| 2.2th | | | ○ | ○ | | | | ○ | | ○ | |
| 2.5th | | ① | ○ | ○ | | ○ | ○ | * | | ○ | * |
| | | ② | ○ | ○ | | ○ | * | * | | * | ○ |
| | | ③ | ○ | ○ | | * | ○ | * | | ○ | ○ |
| 3rd | a | ① | ○ | | ○ | | | ○ | * | | |
| | | ② | ○ | | ○ | | | * | ○ | | |
| | b | | ○ | | ○ | | | ○ | | ○ | * |
| | c | ① | ○ | | ○ | | * | ○ | | | |
| | | ② | ○ | ○ | * | | ○ | ○ | | | |
| | | ③ | * | ○ | ○ | | ○ | ○ | | | |
| 3.2th | | | ○ | ○ | ○ | | | ○ | | ○ | |
| 3.5th | | | ○ | ○ | ○ | | | | | ○ | |
| 4th | | ① | ○ | ○ | ○ | * | ○ | | | | |
| | | ② | ○ | ○ | * | ○ | ○ | | | | |
| | | ③ | ○ | * | ○ | ○ | ○ | | | | |
| | | ④ | * | ○ | ○ | ○ | ○ | | | | |
| 4.5th | | | | ○ | ○ | ○ | | ○ | | ○ | |
| 5th | | | | ○ | ○ | ○ | | | | ○ | |
| Rev | | ① | | ○ | ○ | ○ | ○ | * | | | |
| | | ② | | ○ | ○ | ○ | * | ○ | | | |
| | | ③ | | ○ | ○ | * | ○ | ○ | | | |

As a result, even in the automatic transmission having the structure shown in FIG. 4, like the foregoing embodiment, the controls of both the decision of the trouble of the frictional engagement means and the accompanying change of the engagement/release pattern can be performed by a method conforming to the aforementioned flow chart of FIG. 3, so that the running performance can be maintained in a satisfactory state while avoiding the impossibility of setting any of the speed stages. Moreover, these controls are effected like the embodiment shown in FIG. 2 by the electronic control unit and the hydraulic control means.

Figure 5:
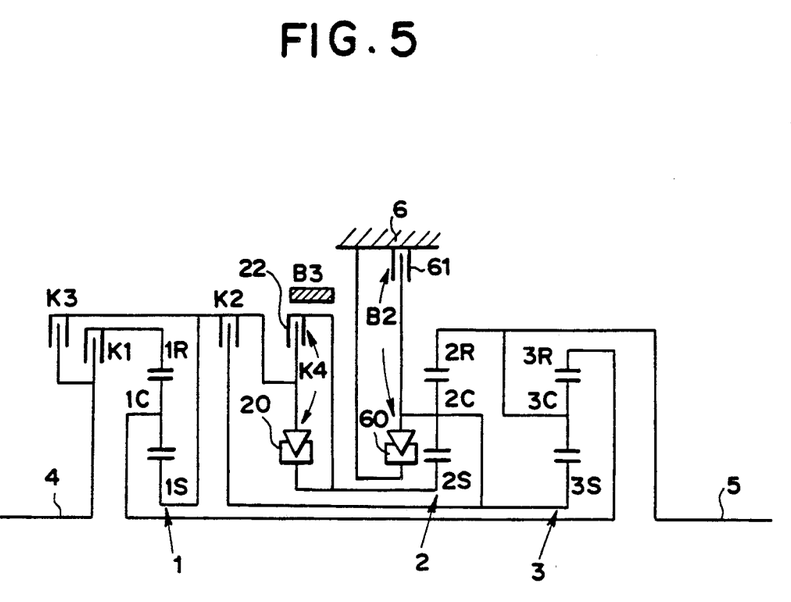
FIG. 5 is a skeleton diagram showing another example of the gear train.
Figure 6:
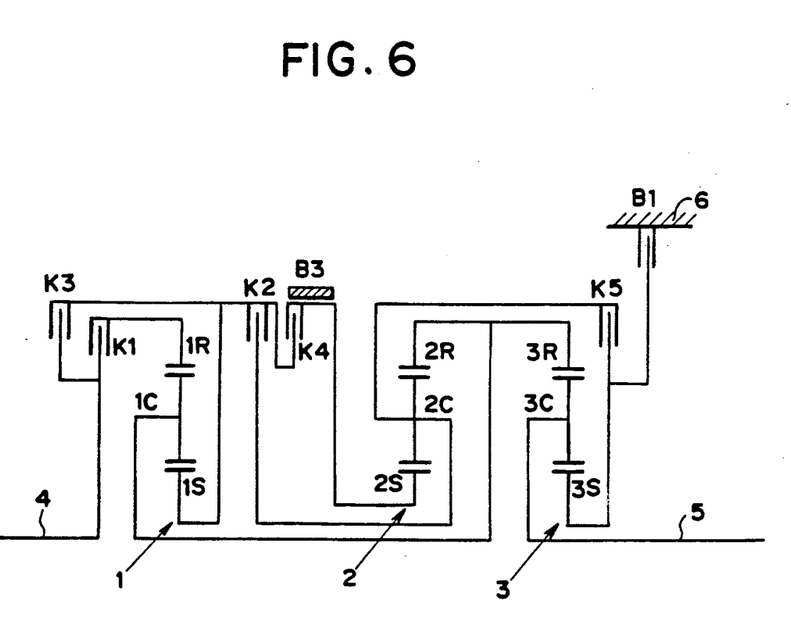
FIG. 6 is a skeleton diagram showing still another example of the gear train.

Other examples of the gear train, to which the present invention can be applied, are shown in FIGS. 5 and 6.

The example shown in FIG. 5 has a structure made similar to that of the gear train shown in FIG. 2, excepting that the fifth clutch means K5 is eliminated from the gear train of FIG. 2 to connect the carrier 2C of the secondary planetary gear set 2 and the sun gear 3S of the third planetary gear set 3 at all times, that the first brake means B1 and the fourth brake means B4 are eliminated, and that the second brake means B2 is composed of a multiple disc brake 61 and a one-way clutch 60 in a parallel relation to each other.

The automatic transmission having the gear train shown in FIG. 5 follows such a clutch and brake application chart as is modified from the foregoing Table 1 by blanking the column of the fifth clutch means K5 and filling up the column of the first brake means B1 or the fourth brake means B4 with symbols ○.

As a result, the automatic transmission equipped with the gear train shown in FIG. 5 can set all the gear stages of Table 1 excepting the 2.2th and 2.7th speeds.

Moreover, the example shown in FIG. 6 has a structure made similar to that of the gear train shown in FIG. 4, excepting that the second brake means B2 and the fourth brake means B4 are eliminated, and that the third brake means B3 is composed of a band brake.

The automatic transmission having the gear train shown in FIG. 6 follows such a clutch and brake application chart as is modified from the foregoing Table 3 by either blanking the columns of the second brake means B2 and the fourth brake means B4 or filling up the same with symbols *.

As a result, the automatic transmission equipped with the gear train shown in FIG. 6 can set all the gear stages enumerated in Table 3.

Incidentally, the embodiment referring to FIG. 2 has been described by taking up as an example the change of the engagement/release pattern for setting the 1st speed. Despite of this description, however, similar controls of another speed stage can naturally be accomplished in the present invention. Moreover, the decision of the failure of the frictional engagement means may be accomplished not by comparing the engine rotatational speed and the output shaft rotational speed but from the time period required for the shift. In FIG. 4, still moreover, the individual frictional engagement means having multiple disc structures are symbolically shown, but any of them can be constructed to have a one-way clutch like the structure shown in FIG. 2. On the other hand, the foregoing individual embodiments have been direction to the structure in which the gear train is constructed of the three single-pinion type planetary gear sets. Despite of this fact, however, the present invention can be applied to an automatic transmission in which the gear train is constructed of double-pinion type planetary gear sets. In short, the present invention can be applied to an automatic transmission having a plurality of kinds of engagement/release patterns for setting the individual speed stages, as are disclosed in our Japanese Patent Applications Nos. Hei 1-185151, Hei 1-185152, Hei 1-186991, Hei 1-186992, Hei 1-205478, Hei 1-280957 and so on.

As has been apparent from the description thus far made, according to the automatic transmission of the present invention, the plural kinds of engagement/release patterns can be effectively used to avoid as much as possible the impossibility of setting a predetermined speed stage due to the engagement failure of the frictional engagement means so that the running performance can be maintained at a satisfactory state.

What is claimed is:

1. In an automatic transmission comprising a plurality of frictional engagement means, and a gear train adapted to set a plurality of speed stages each having different gear ratios in accordance with a selected combination for engagement/release of said frictional engagement means, wherein at least one of said plurality of speed stages may be set by plural combinations for engaging and releasing said frictional engagement means, a shift control system comprising:

detection means for detecting an engagement failure of said frictional engagement means;

engagement/release pattern selecting means for selecting one of said plural combinations for engagement/release of said frictional engagement means for setting said one speed stage based on selecting conditions, and for selecting another of said plural combinations for engagement/release of said frictional engagement means for setting said one speed stage when the engagement failure of said frictional engagement means is detected; and output means for outputting an instruction signal for setting the selected another combination for engagement/release of said frictional engagement means to set said one speed stage.

2. A shift control system according to claim 1, wherein said gear train comprises an input shaft connected to an engine, and an output shaft, and wherein said detection means comprises means to detect the engagement failure of said frictional engagement means from the rotational speed of the engine, the rotational speed of said output shaft, and the gear ratio of said one speed stage.

3. A shift control system according to claim 1, wherein said engagement/release pattern selecting means comprises means to select said another of said plural combinations based on vehicle conditions.

4. A shift control system according to claim 3, wherein said selecting conditions include at least one of the load torque to be applied to the frictional engagement means to be engaged, the number of the frictional engagement means to be switched for a shift, and the fluctuating rotational speeds of said rotary components at the time of a shift.

5. A shift control system according to claim 1, wherein said gear train comprises:

an input shaft;

an output shaft;

a first planetary gear set comprising a first sun gear, a first ring gear, a pinion gear meshing with said first sun gear and said first ring gear, and a first carrier supporting said pinion gear;

a second planetary gear set comprising a second sun gear connected integrally or selectively to said first sun gear, a second ring gear, a second pinion gear meshing with said second sun gear and said second ring gear, and a second carrier supporting said second pinion gear; and a third planetary gear set comprising a third sun gear connected integrally or selectively to said second carrier; a third ring gear connected integrally or selectively to said first carrier, a third pinion gear meshing with said third sun gear and said third ring gear, and a third carrier supporting said third pinion gear and connected integrally or selectively to said second ring gear.

6. A shift control system according to claim 5, wherein said frictional engagement means comprises:

first clutch means for connecting said input shaft and said first ring gear selectively;

second clutch means for connecting said first sun gear and said second carrier selectively;

third clutch means for connecting said input shaft and said first sun gear selectively;

fourth clutch means for connecting said first sun gear and said second sun gear selectively;

first brake means for stopping the revolutions of said second carrier selectively; and second brake means for stopping the revolutions of said second sun gear selectively, and wherein said output shaft is connected to said second ring gear or said third carrier.

7. A shift control system according to claim 6, wherein said fourth clutch means comprises a one-way clutch and a multiple disc clutch in parallel relation to each other, wherein said first brake means comprises a multiple disc brake and a one-way clutch in parallel relation to each other, and wherein said second brake means comprises a band brake.

8. A shift control system according to claim 1, wherein said gear train comprises:

an input shaft;

an output shaft;

a first planetary gear set comprising a first sun gear, a first ring gear, a pinion gear meshing with said first sun gear and said first ring gear, and a first carrier supporting said pinion gear;

a second planetary gear set comprising a second sun gear connected integrally or selectively to said first sun gear, a second ring gear connected integrally or selectively to said first carrier, a second pinion gear meshing with said second sun gear and said second ring gear, and a second carrier supporting said second pinion gear; and a third planetary gear set comprising a third sun gear connected integrally or selectively to said second carrier, a third ring gear connected integrally or selectively to said second ring gear, a third pinion gear meshing with said third sun gear and said third ring gear, and a third carrier supporting said third pinion gear.

9. A shift control system according to claim 8, wherein said frictional engagement means comprises:

first clutch means for connecting said input shaft and said first ring gear selectively;

second clutch means for connecting said first sun gear and said second carrier selectively;

third clutch means for connecting said input shaft and said first sun gear selectively;

fourth clutch means for connecting said first sun gear and said second sun gear selectively;

fifth clutch means for connecting said second carrier and said third sun gear selectively;

second brake means for stopping the rotation of said second sun gear selectively; and third brake means for stopping the rotation of said third sun gear selectively, and wherein said output shaft is connected to said third carrier.

10. A shift control system according to claim 9, wherein said second brake means comprises a band brake.

11. In an automatic transmission comprising a plurality of frictional engagement means, and a gear train adapted to set a plurality of speed stages each having different gear ratios in accordance with a selected combination for engagement/release of said frictional engagement means, wherein at least one of said speed stages may be set by plural combinations for engaging and releasing said frictional engagement means, a shift control method comprising the steps of:

detecting an engagement failure of said frictional engagement means;

selecting one of said plural combinations for engagement/release of said frictional engagement means for setting said one speed stage based on selecting conditions, and for selecting another of said plural combinations for engagement/release of said frictional engagement means for setting said one speed stage when the engagement failure of said frictional engagements means is detected; and outputting an instruction signal for setting the selected another combination for engagement/release of said frictional engagement means to set said one speed stage.

12. A shift control method according to claim 11, wherein the engagement failure of said frictional engagement means is detected from the rotational speed of an engine, the rotational speed of an output shaft, and the gear ratio of said one speed stage.

* * * * *